US011870808B1

(12) United States Patent
Chiaraviglio et al.

(10) Patent No.: US 11,870,808 B1
(45) Date of Patent: *Jan. 9, 2024

(54) MOBILE DEVICE SECURITY APPLICATION FOR MALICIOUS WEBSITE DETECTION BASED ON REPRESENTATIVE IMAGE

(71) Applicant: Zimperium, Inc., Dallas, TX (US)

(72) Inventors: Nicolás Chiaraviglio, Barcelona (ES); Ryan Chazen, South Africa (ZA); Elad Golan, Even-Yehuda (IL); Izhak Kedar, Tel-Aviv (IL); Massimo Dragano, Gzira (MT); Asaf Peleg, Kadima-Zoran (IL)

(73) Assignee: Zimperium, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,853

(22) Filed: Nov. 14, 2022

Related U.S. Application Data

(63) Continuation of application No. 16/714,459, filed on Dec. 13, 2019, now Pat. No. 11,528,297.

(60) Provisional application No. 62/947,487, filed on Dec. 12, 2019.

(51) Int. Cl.
*H04L 9/40* (2022.01)
*G06V 30/418* (2022.01)

(52) U.S. Cl.
CPC ........ *H04L 63/1483* (2013.01); *G06V 30/418* (2022.01); *H04L 63/1433* (2013.01)

(58) Field of Classification Search
CPC . H04L 63/1433; H04L 63/1483; H04L 63/14; H04L 63/1441; G06V 30/418; G06V 30/40; G06V 30/41
See application file for complete search history.

(56) References Cited

U.S. PATENT DOCUMENTS

| | | | |
|---|---|---|---|
| 8,296,255 B1 | 10/2012 | Wawda | |
| 8,776,220 B2* | 7/2014 | Chen | ................... H04L 63/1483 709/224 |
| 8,831,358 B1 | 9/2014 | Song et al. | |
| 9,065,850 B1 | 6/2015 | Sobrier | |
| 10,148,681 B2* | 12/2018 | Banerjee | ............. H04L 63/1441 |
| 10,164,975 B1 | 12/2018 | Son et al. | |
| 10,834,128 B1 | 11/2020 | Rajagopalan et al. | |
| 11,146,576 B1 | 10/2021 | Mushtaq | |
| 2005/0084175 A1 | 4/2005 | Olszak | |
| 2007/0118528 A1* | 5/2007 | Choi | ..................... H04L 51/212 707/999.009 |

(Continued)

OTHER PUBLICATIONS

United States Office Action, U.S. Appl. No. 16/714,459, dated Mar. 22, 2022, 17 pages.

*Primary Examiner* — Khang Do
(74) *Attorney, Agent, or Firm* — Fenwick & West LLP

(57) ABSTRACT

A system and a method are disclosed for detecting a malicious website. In an embodiment, a mobile device detects a URL referencing an unknown website. Responsive to detecting the URL, the mobile device retrieves a representative image of the unknown website. The mobile device determines whether the representative image matches an image of a known legitimate website. Responsive to determining that the representative image matches the image of the known legitimate website, the mobile device determines if the unknown website is malicious. The mobile device performs a security action responsive to determining that the website is malicious.

17 Claims, 7 Drawing Sheets

(56) References Cited

U.S. PATENT DOCUMENTS

| | | |
|---|---|---|
| 2007/0250920 A1 | 10/2007 | Lindsay |
| 2007/0261112 A1* | 11/2007 | Todd .................... H04L 63/1483 726/2 |
| 2008/0046738 A1* | 2/2008 | Galloway ........... H04L 63/1416 713/176 |
| 2008/0141342 A1* | 6/2008 | Curnyn ............... H04L 63/0428 726/3 |
| 2008/0163369 A1* | 7/2008 | Chang ................ H04L 63/1483 726/22 |
| 2010/0186088 A1* | 7/2010 | Banerjee ................ G06F 21/56 709/224 |
| 2010/0218253 A1* | 8/2010 | Sutton ................. G06F 21/554 726/23 |
| 2011/0102549 A1 | 5/2011 | Takahashi |
| 2012/0159620 A1 | 6/2012 | Seifert et al. |
| 2013/0215232 A1 | 8/2013 | Nanri et al. |
| 2014/0169642 A1 | 6/2014 | Law et al. |
| 2014/0173726 A1* | 6/2014 | Varenhorst .......... H04L 63/1416 726/22 |
| 2014/0289196 A1 | 9/2014 | Chan et al. |
| 2015/0180746 A1* | 6/2015 | Day, II .................... H04L 67/55 455/405 |
| 2015/0235630 A1 | 8/2015 | Rasmusson |
| 2015/0244728 A1* | 8/2015 | Tao .................... H04L 63/1483 726/23 |
| 2015/0261955 A1* | 9/2015 | Huang ................. G06F 21/567 726/23 |
| 2016/0048536 A1 | 2/2016 | Di et al. |
| 2016/0063541 A1* | 3/2016 | Geng ................. G06Q 30/0277 705/14.47 |
| 2016/0142439 A1 | 5/2016 | Goutal |
| 2016/0241592 A1* | 8/2016 | Kurkure ................. H04L 63/08 |
| 2016/0349936 A1 | 12/2016 | Cho et al. |
| 2017/0093910 A1* | 3/2017 | Gukal ................ H04L 63/1491 |
| 2017/0223046 A1* | 8/2017 | Singh ................ H04L 63/1491 |
| 2017/0289191 A1* | 10/2017 | Thioux ............... H04L 63/1441 |
| 2018/0115584 A1* | 4/2018 | Alhumaisan ........ H04L 63/1483 |
| 2018/0121720 A1* | 5/2018 | Becker ................ G06V 30/418 |
| 2018/0174328 A1 | 6/2018 | Wan et al. |
| 2018/0191777 A1 | 7/2018 | Volkov |
| 2018/0213119 A1 | 7/2018 | Sasaki |
| 2018/0302425 A1* | 10/2018 | Esman, Sr. ............ G06N 3/045 |
| 2019/0014149 A1 | 1/2019 | Cleveland et al. |
| 2019/0065799 A1 | 2/2019 | Santi et al. |
| 2019/0068638 A1* | 2/2019 | Bartik ................ H04L 63/1483 |
| 2019/0104154 A1* | 4/2019 | Kumar ................... G06N 20/00 |
| 2019/0130529 A1 | 5/2019 | Son et al. |
| 2019/0268373 A1* | 8/2019 | Celik ....................... H04L 51/08 |
| 2020/0036751 A1* | 1/2020 | Kohavi ............... H04L 63/1416 |
| 2020/0067861 A1* | 2/2020 | Leddy ................. G06F 21/6245 |
| 2020/0314122 A1* | 10/2020 | Jones ................. H04L 63/1408 |
| 2020/0358799 A1* | 11/2020 | Boyer ..................... H04L 51/42 |
| 2021/0089806 A1 | 3/2021 | Qiu et al. |
| 2021/0133229 A1 | 5/2021 | Astrakhantsev et al. |
| 2021/0141577 A1 | 5/2021 | Ito |
| 2021/0160281 A1 | 5/2021 | Hallaji et al. |
| 2021/0295484 A1 | 9/2021 | Hodge |
| 2022/0030029 A1* | 1/2022 | Kagan ....................... G06N 3/08 |
| 2023/0007042 A1* | 1/2023 | Haworth ............... H04L 63/205 |

\* cited by examiner

MOBILE DEVICE SECURITY APPLICATION FOR MALICIOUS WEBSITE DETECTION BASED ON REPRESENTATIVE IMAGE

CROSS-REFERENCE TO RELATED APPLICATIONS

This application is a continuation of U.S. application Ser. No. 16/714,459, filed Dec. 13, 2019, which claims the benefit of U.S. Provisional Application No. 62/947,487, filed Dec. 12, 2019, the disclosure of which are hereby incorporated by reference herein in their entirety.

TECHNICAL FIELD

The disclosure generally relates to the field of data security, and more particularly relates to malicious website detection based on a representative image of a potentially malicious website.

BACKGROUND

Mobile devices are prone to risk from malicious websites. For example, users often navigate from website to website using links whose underlying universal resource locators (URLs) may be hidden or obscured by the text of a hyperlink. Tools for detecting whether a website encountered in network traffic of a mobile device are processing-intensive, often requiring access to bloated classifiers that cannot be practically implemented in a mobile device. Thus, these classifiers are located on remote servers, resulting in large bandwidth consumption, high latency, and delayed processing, as well as potential tampering of the traffic by an attacker that can block the potential analysis.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
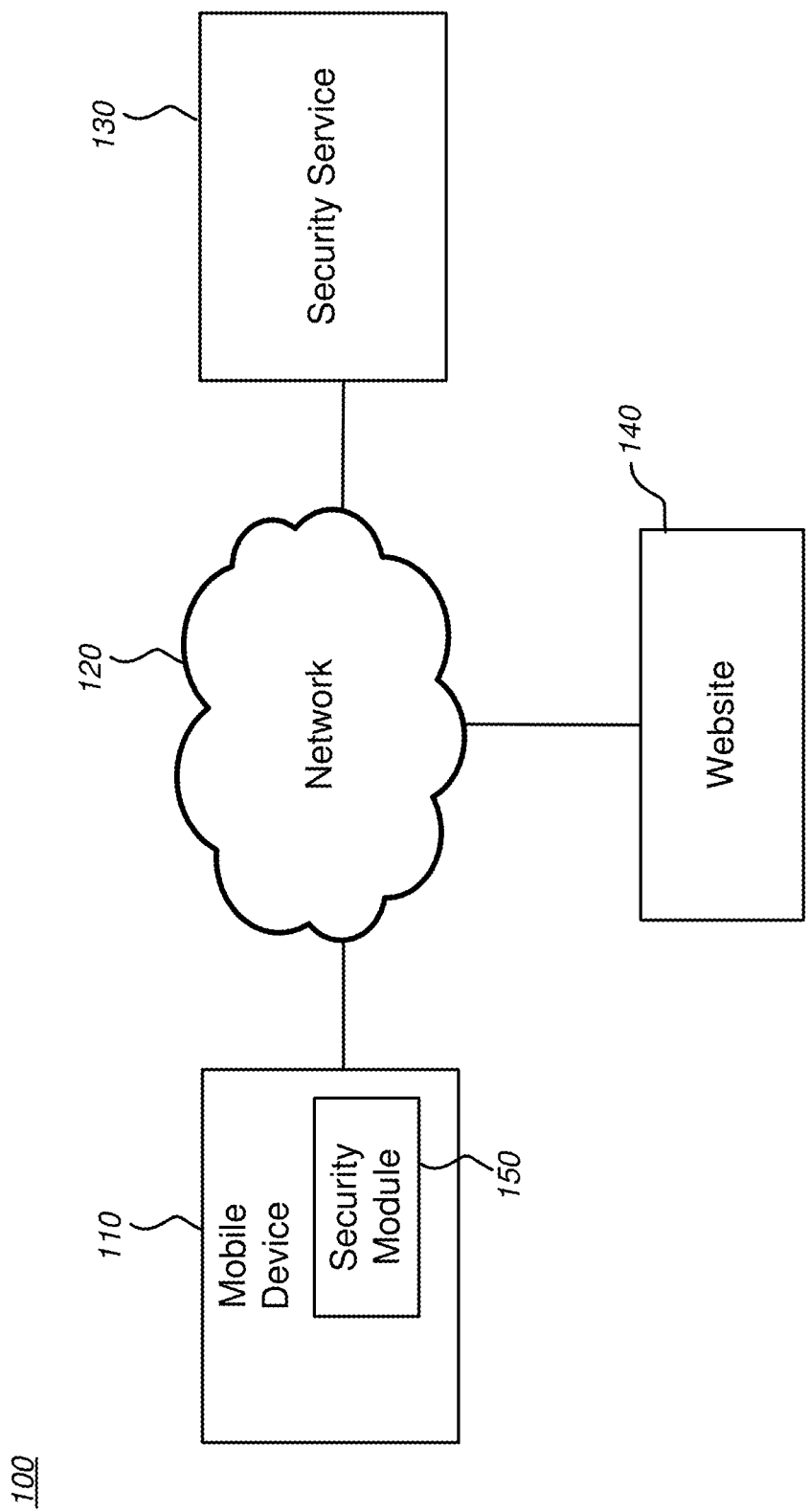
FIG. 1 illustrates one embodiment of a system environment including a mobile device with a security module.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes a security module installed on a mobile device that enables a mobile device to detect a malicious website without offloading processing to a server. The security module retrieves a representative image (e.g., a favicon) of an unknown website, such as a website that has an unrecognized domain, the unknown website being linked to on an open page or application of the mobile device. The security application compares the representative image to images of known legitimate websites to determine whether the unknown website is malicious. Where the unknown website is malicious, the security application performs a security action (e.g., prevents access to the malicious website, quarantines a link, etc.).

System Overview

Figure (FIG.) 1 illustrates one embodiment of a system environment including a mobile device with a security module. Environment 100 includes mobile device 110 with security module 150 installed thereon. Environment 100 also includes network 120, security service 130, and website 140. Mobile device 110 may be any computing device capable of being carried by a human being, such as a smart phone, a tablet, a wearable computing device such as a smart watch, an Internet-of-Things (IoT) device, and the like. As mobile device 110 encounters network traffic from network 120 relating to a website 140, security module 150 determines whether website 140 is malicious. Network 120 may be any network, such as the Internet. Security module 150 performs this task by analyzing network traffic for security risks, and taking action where security risks are found (e.g., logging the encounter, alerting the user of device 110, etc.). Security module 150 may run in a virtual private network (VPN) that tracks network traffic.

Security service 130 may provide security module 150 to mobile device 110 for installation, and may store classifiers and data not suitable for storage on mobile device 110 (e.g., due to memory limitations on mobile device 110). While security service 130 is depicted as a single entity in environment 100, this is for convenience; security service 130 may be distributed across multiple servers, and the functionality of security service 130 may, in whole or in part, be stored in mobile device 110 as part of security module 150. Further details about security module 150 are described below with reference to FIGS. 2-3. Further details about security service 130 are described below with reference to FIG. 4.

Security Module Configuration

Figure 2:
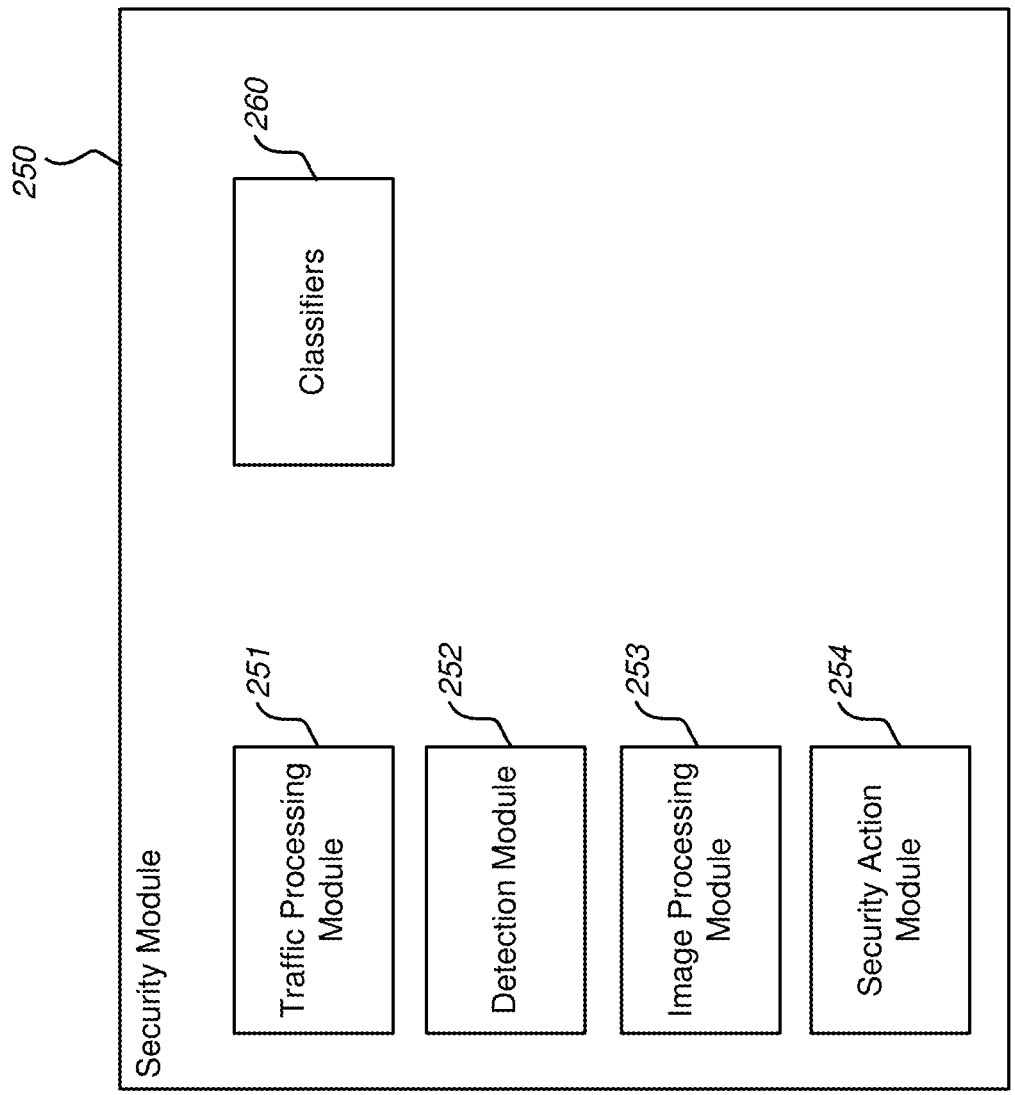
FIG. 2 illustrates one embodiment of exemplary sub-modules of a security module.

FIG. 2 illustrates one embodiment of exemplary sub-modules of a security module. Security module 250 includes all functionality described with respect to security module 150, and vice versa. Security module 250 includes traffic processing module 251, detection module 252, image processing module 253, and security action module 254. Security module 250 additionally includes classifiers 260. The modules and classifiers depicted with respect to security module 250 are exemplary; more or fewer modules, classifiers, and data may be used, consistent with the disclosure provided herein.

Traffic processing module 251 detects and analyzes network traffic. Network traffic includes any traffic received by mobile device 110 from network 120. In an exemplary embodiment, traffic processing module 251 analyzes network traffic received when mobile device 110 is in a VPN session. Traffic processing module 251 may detect network traffic when a user navigates a browser to a page, when a user launches or operates an application on mobile device 110, when mobile device 110 makes a data call over network 120 for any pre-programmed reason, when the user receives an email with a link to a website, and the like.

Traffic processing module 251 identifies whether the network traffic includes one or more URLs. To identify whether the network traffic includes a URL, traffic processing module 251 analyzes network traffic (e.g., header or payload information of network packets) for patterns that match known patterns of URLs. For example, traffic processing module 251 may compare text in data packets to one or more URL templates, each template indicating a known format of a URL (e.g., "http://www."; "https://www."; "https://goo.gl" are all known prefixes for URLs). The URL templates may be stored local to security module 150, or by security service 130, and may be periodically updated. Traffic processing module 251 identifies a URL when a string of characters in network traffic match a known pattern.

Figure 3:
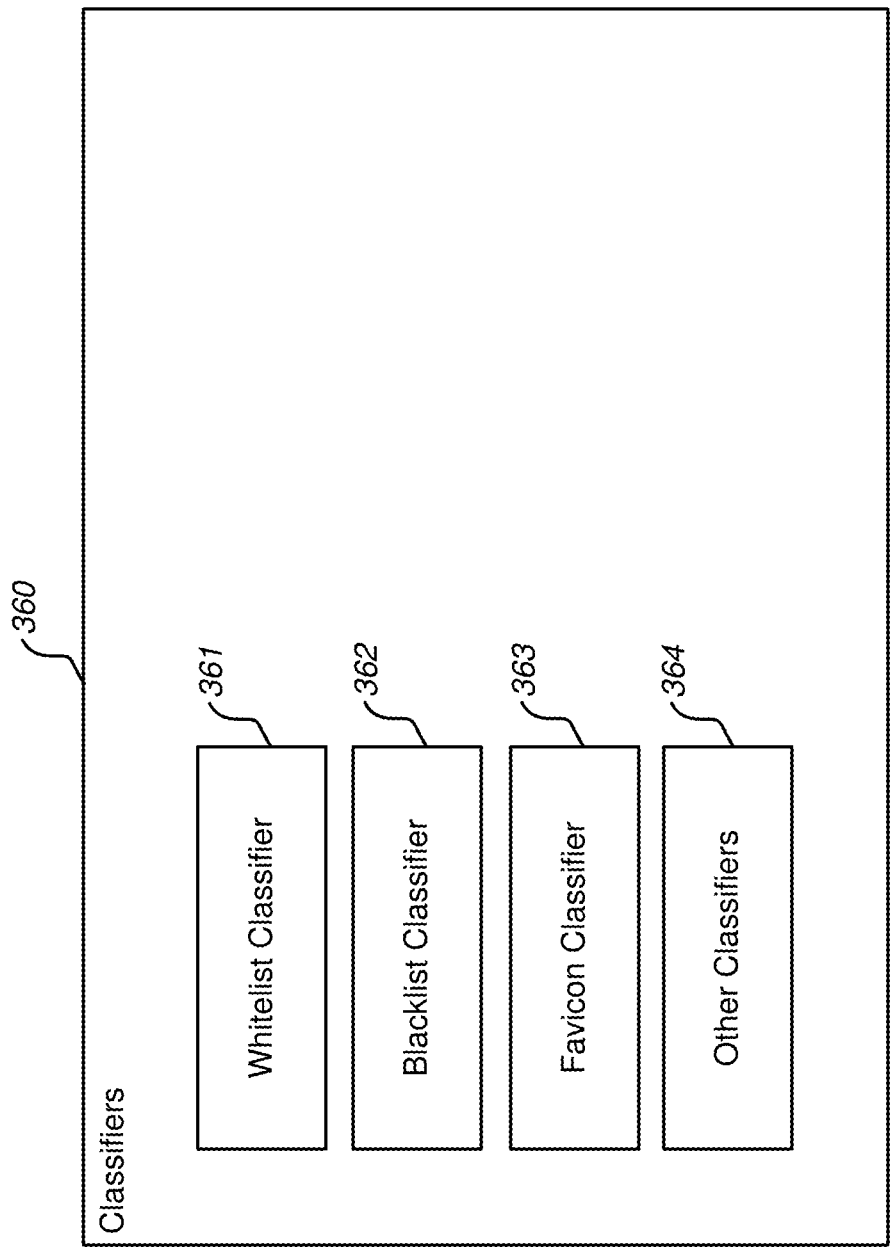
FIG. 3 illustrates one embodiment of exemplary classifiers used by a security module.

Detection module 252 analyzes URLs identified in network traffic for security risks. As used herein, the term security risk refers to a website that may be malicious. A malicious website may be a website that is a phishing website. A phishing website is a website that imitates a legitimate website, but is not the legitimate website. In order to determine whether a URL poses a security risk, detection module 252 applies the URL as input to one or more classifiers 260. The classifiers output either binary results (e.g., "security risk" or "no security risk"), or results that may be used by detection module 252, or downstream classifiers, along with other information, to determine whether a security risk exists. Turning to FIG. 3, where classifiers 260 are expanded upon, FIG. 3 illustrates one embodiment of exemplary classifiers used by a security module. Classifiers 360 include the same weight of description provided with respect to classifiers 260, and vice versa. Classifiers 360 include whitelist classifier 361, blacklist classifier 362, favicon classifier 363, and other classifiers 364.

In an embodiment, detection module 252 sends, as input to whitelist classifier 361, an identified URL. Whitelist classifier 361 compares at least a portion of the identified URL to a database of trusted URLs (to be discussed in further detail with reference to FIG. 4). If the comparison yields a match, whitelist classifier 361 outputs a binary output—that is, either that the identified URL is whitelisted, and thus does not pose a security risk, or that the identified URL is not whitelisted. An identified URL that is not whitelisted may, but does not necessarily, pose a security risk.

In an embodiment, detection module 252 sends, as input to blacklist classifier 362, an identified URL. Blacklist classifier 362 compares at least a portion of the identified URL to a database of non-trusted URLs (to be discussed in further detail with reference to FIG. 4). If the comparison yields a match, blacklist classifier 362 outputs a binary output—that is, that the identified URL is blacklisted, and thus poses a security risk, or that the identified URL is not blacklisted. An identified URL that is not blacklisted may, but does not necessarily, pose a security risk.

Whitelist classifier 361 and blacklist classifier 362 may be used as gating classifiers —if an identified URL is whitelisted or blacklisted, then detection module 252 may determine that no further processing is required, because it is known by virtue of whitelisting that a whitelisted identified URL does not pose a security risk, and because it is known by virtue of blacklisting that a blacklisted identified URL does pose a security risk. However, if an identified URL is neither whitelisted nor blacklisted, then detection module 252 performs additional analysis to determine whether the identified URL poses a security risk. The reason that additional analysis is performed is because the identified URL is for an unknown website—that is, known websites are either whitelisted or blacklisted, and it is unclear whether a URL not referenced by the whitelist or blacklist is a security risk.

Detection module 252 may utilize favicon classifier 363, or other classifiers 364, to determine whether the identified URL poses a security risk. Utilization of favicon classifier 363, or other classifiers 364, may be performed following the use of whitelist classifier 361 and/or blacklist classifier 362 as gating classifiers, or may be performed without an initial use of whitelist classifier 361 and/or blacklist classifier 362. When using favicon classifier 363, detection module 252 first derives a representative image from the identified website. The representative image may be a favicon of the identified website. A favicon is an image that appears in a browser tab in which a website is open, and typically depicts a brand associated with the website. While the term "favicon classifier" is used, any representative image may be used in place of a favicon. Any image used or linked in the website 140 or the image resulting from the rendering of the website 140 can be used in place of a favicon (e.g., a brand image).

After retrieving the favicon, detection module 252 compares the favicon to a set of images from legitimate websites, each image of the set being associated with one or more websites. As an exemplary use case, the set of images may be in the form of a quilt, though other manners of storing and binding images may be used. The manner in which the quilt is constructed, and further information about how legitimate websites are identified, is described in further detail below with respect to FIG. 4. As part of the quilt construction, image processing may be performed before adding a given image to the quilt; image processing module 253 may perform some or all of the same image processing performed by security service 430 to the images added to the quilt to the favicon in order to aid with the comparison.

Based on the comparing, detection module 252 determines whether the favicon matches an image of the quilt. To determine whether the favicon matches an image of the quilt, detection module 252 may determine a percentage match between an image of the quilt and the favicon. The percentage match may be determined based on a fraction of pixels that match between the two images, as compared to a fraction of pixels that do not match between the two images. Detection module 252 may determine whether the percentage match exceeds a predefined threshold, and may determine that the favicon matches the image of the quilt based on the percentage match meeting or exceeding the threshold. Other mechanisms for determining similarity between images may be used in place of a percentage match.

In an embodiment, where the favicon matches an image of the quilt, detection module 252 receives as output from favicon classifier 363 an indication that the identified URL is using resources of a known brand. This could mean that the URL is a legitimate website or the identified URL is from an unknown website using a favicon of a known, legitimate website, and thus is likely maliciously posing to be the known website. In another embodiment, detection module 252 receives as output from favicon classifier 363 one or more legitimate website identifiers corresponding to the matched image in the quilt. Other classifiers 364 may include a classifier that maps legitimate website identifiers to URLs known to correspond to those legitimate website identifiers. The output of such a classifier is binary; if the unknown URL is determined to map to the legitimate website identifier, then the output would be that the unknown URL is not a security risk. If the unknown URL, however, is determined to not map to the legitimate website identifier, then the output would be that the unknown URL is a security risk. Thus, detection module 252 may feed the output of favicon classifier 363 as input to the other classifier 364, and determine, based on output of the other classifier 364, whether the identified URL is a security risk. In an embodiment, any combination of classifiers 360 may produce outputs, each of the outputs forming a signal. An additional classifier of other classifiers 364 may take, as input, each of the signals, and may output whether the identified website is malicious.

Where the favicon does not match the image of the quilt, then detection module 252 determines that whether the identified URL is a security risk cannot be determined from favicon classifier 363. Other classifiers 364 may be used to determine whether the identified URL is a security risk. Examples of such classifiers are URL Net classifiers that classify the identified URL based on characteristics of the text that forms the URL, Hyper Text Markup Language (HTML) classifiers that classify a website based on an analysis of HTML resources on that websites, brand detection classifiers using a screen shot of a website, classifiers that provide output based on style sheets of websites, phishing kit detection classifiers that are prepackaged classifiers, and classifiers that output whether a website is a security risk based on available metadata for a given domain.

Returning to FIG. 2, where a security risk is detected for the identified URL, security action module 254 performs one or more security actions responsive to detecting the identified URL. In an embodiment, a security action may be user-facing and may impact what is displayed by mobile device 110. For example, the security action may be to disable selection of a link including the identified URL, or to prompt the user, responsive to selection of the link, with a warning that the user may click through to access the website using the identified URL. The security action may not be user-facing, and may instead be to log the detection, to update a block chain to indicate the detection, to alert a system administrator, and the like. Exemplary security actions include outputting a warning to a user, blocking access to the website, and the like.

Figure 4:
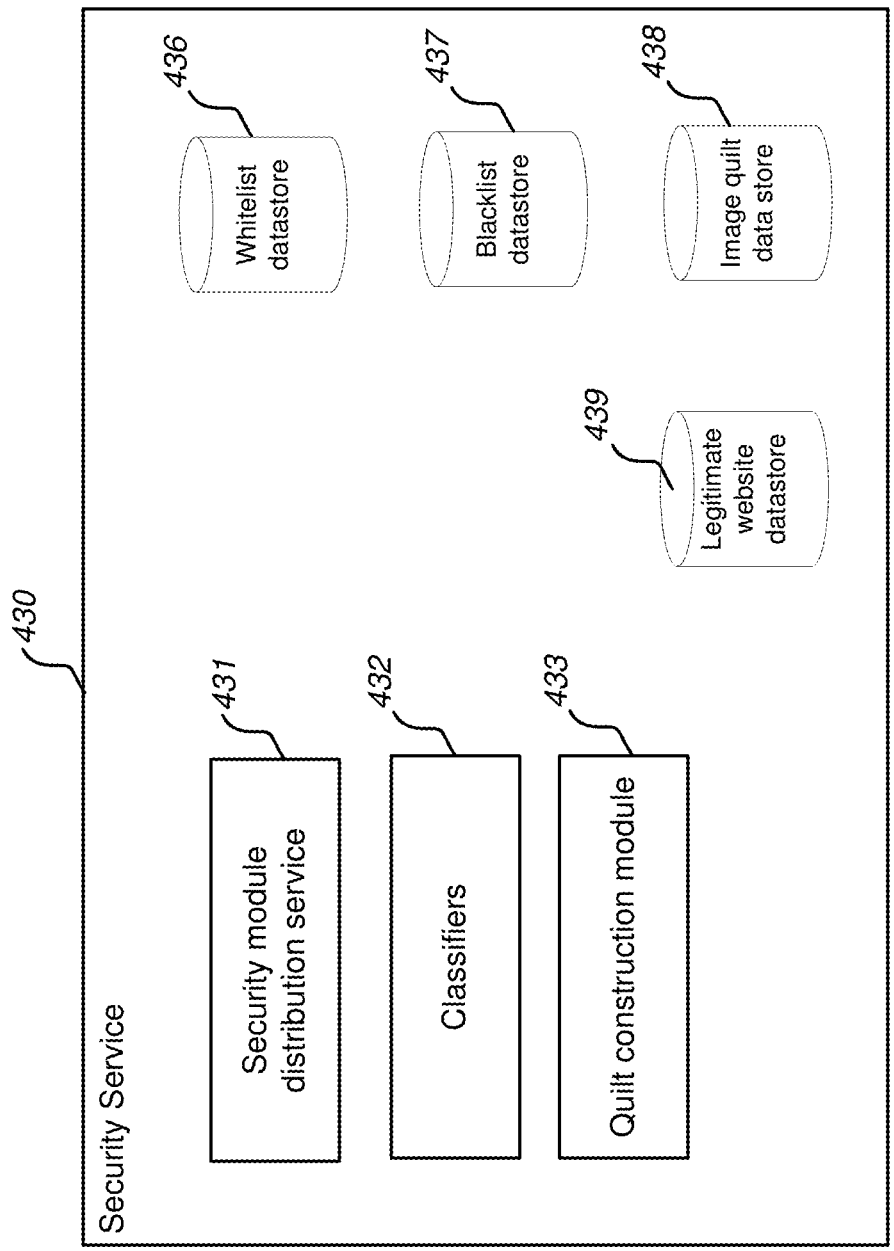
FIG. 4 illustrates one embodiment of exemplary components of a security service.

FIG. 4 illustrates one embodiment of exemplary components of a security service. Security service 430 includes the weight of description of security service 130 described with respect to FIG. 1, and vice versa. Security service 430 includes security module distribution service 431, classifiers 432, and quilt construction module 433. Security service 430 also includes whitelist datastore 436, blacklist datastore 437, image quilt datastore 438, and legitimate website datastore 439. Modules and databases of security service 430 may be, in whole or in part, implemented in mobile device 110, rather than on one or more servers. Security mobile distribution service 431 distributes security module 150 to mobile device 110 (e.g., in response to a request to download security module 150 from mobile device 110 or via a push notification from the server). Security mobile distribution service 431 may also distribute updates to security module 150 (e.g., updates to classifiers 260, an updated quilt, etc.), or responses to inquiries from security module 150.

Classifiers 432 may include any of classifiers 360. Security service 430 may apply classifiers 432 to an identified URL as requested by security mobile distribution service 431. For example, where mobile device 110 does not have sufficient processing resources, mobile device 110 may request that security service 430 apply classifiers 432 to offload some of the processing. Whitelist datastore 436 maintains a list of whitelisted URLs, which may be distributed as part of an update to mobile device 110 by security module distribution service 431. Blacklist datastore 437 similarly maintains a list of blacklisted URLs, which may also be distributed to mobile device 110 by security module distribution service 431.

Quilt construction module 433 generates the quilt used in connection with favicon classifier 363. In order to generate the quilt, quilt construction module 433 obtains identifiers of legitimate websites from legitimate website datastore 439. Legitimate website datastore 439 may be populated by an administrator. Alternatively, or additionally, legitimate website datastore 439 may be populated by website identifiers for domains that satisfy predefined criteria, such as being linked to by a threshold number of domains that are already referred to by legitimate website datastore 439. Legitimate websites are websites known to not pose security risks.

Figure 5:
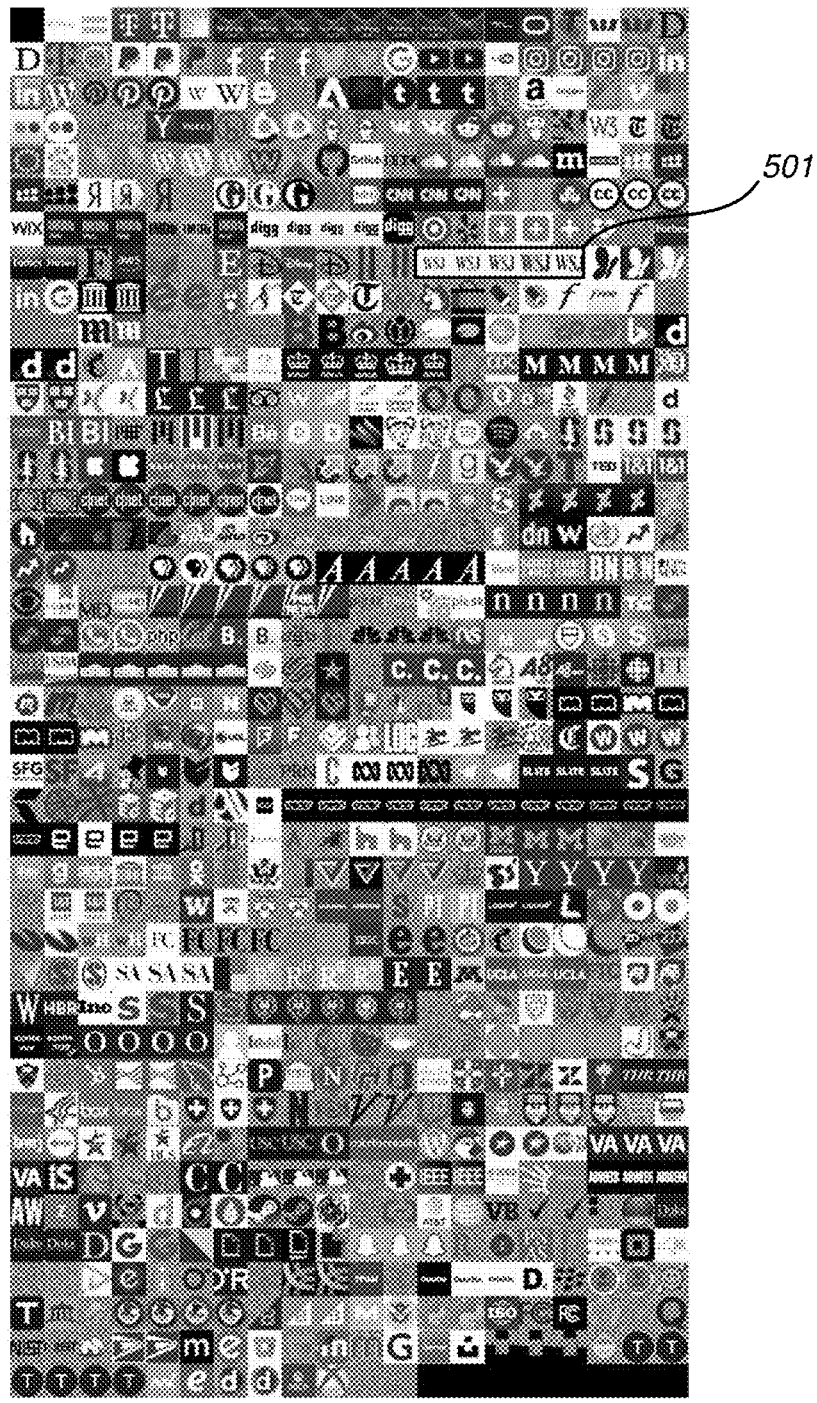
FIG. 5 illustrates one embodiment of a quilt of exemplary images.

Quilt construction module 433 retrieves images from the legitimate websites. In an embodiment, quilt construction module 433 crawls each legitimate website and stores those images in association with the legitimate website (e.g., in legitimate website datastore 439). In an alternative embodiment, quilt construction module 433 receives the images from an administrator of each legitimate website. Either way, the images are known images, in that they are known to originate from a known, legitimate website. Quilt construction module 433 then constructs a quilt of the retrieved images by concatenating the images into the quilt, and stores the quilt in image quilt datastore 438. Turning now to FIG. 5, which illustrates one embodiment of a quilt of exemplary images of legitimate websites, quilt 500 includes images from different legitimate websites, all stitched together into an aggregation of the images. As can be seen in quilt 500, one legitimate website may have multiple associated images, such as images 501, which each are different from one another, and each correspond to the Wall Street Journal.

In an embodiment, in order to stitch the images of quilt 500 together, quilt construction module 433 may resize the retrieved images into a standard size. For example, all images may be resized to 64×64 pixels. Quilt construction module 433 may perform this resizing when the images are retrieved, and thus may store the resized images, rather than the originally retrieved images, in legitimate website datastore 439 prior to constructing quilt 500. Alternatively, quilt construction module 433 may perform this resizing when constructing the quilt from the images in legitimate website datastore 439.

From time to time, quilt construction module 433 may again crawl (or otherwise obtain images from) websites identified by legitimate websites datastore 439. When doing so, quilt construction module 433 may determine whether retrieved images are already in legitimate website datastore 439 and/or in quilt 500, and if so, may discard those newly retrieved images. If the retrieved images are not already stored, quilt construction module 433 may retain those images for inclusion in quilt 500. Quilt 500 may be recreated at future times from the images stored in legitimate website datastore 439, or may be updated at future times by appending newly retrieved images to quilt 500 as those images are retrieved, as well as changes made by an admin.

Quilt construction module 433 may, beyond resizing images used to construct quilt 500, also (or alternatively) otherwise edit and filter the images. Quilt construction module 433 may remove a transparency layer of each image, and may apply a filter to the image. One such filter is a noise patch, such as a red-green-blue (RGB) salt and pepper noise patch, which may be used to replace the transparency layer of the images. An advantage of replacing the transparency layer in this manner is that transparent features of the images will be made to look like the applied noise patch. If the same image processing is applied to a representative image that is being compared to the images of favicon (e.g., using image processing module 253), then the likelihood of correctly matching the representative image to an image of the quilt improves, insofar as transparent features in the images may be difficult to detect and match. Finally, after any necessary image processing is performed, Quilt construction module 433 concatenates the images into quilt 500 (or adds additional images to an existing quilt 500).

Returning to the discussion of FIG. 2, rather than having quilt construction module 433 edit and filter the images, image processing module 253 may perform the editing and/or filtering of the images at the time that favicon classifier 363 is applied. For example, an image processing module 253 may access an unedited quilt, and remove the transparency layer and apply a filter to the quilt. Alternatively, the image processing module 253 may access a quilt that had its transparency layer removed by quilt construction module 433, and image processing module 253 may apply the filter to the quilt. The same filter may be applied to the favicon. An advantage of using image processing module 253 to perform the image processing on both the quilt and the favicon is to ensure that the same noise image is used, which improves the accuracy of the matching performed by favicon classifier 363.

Figure 6:
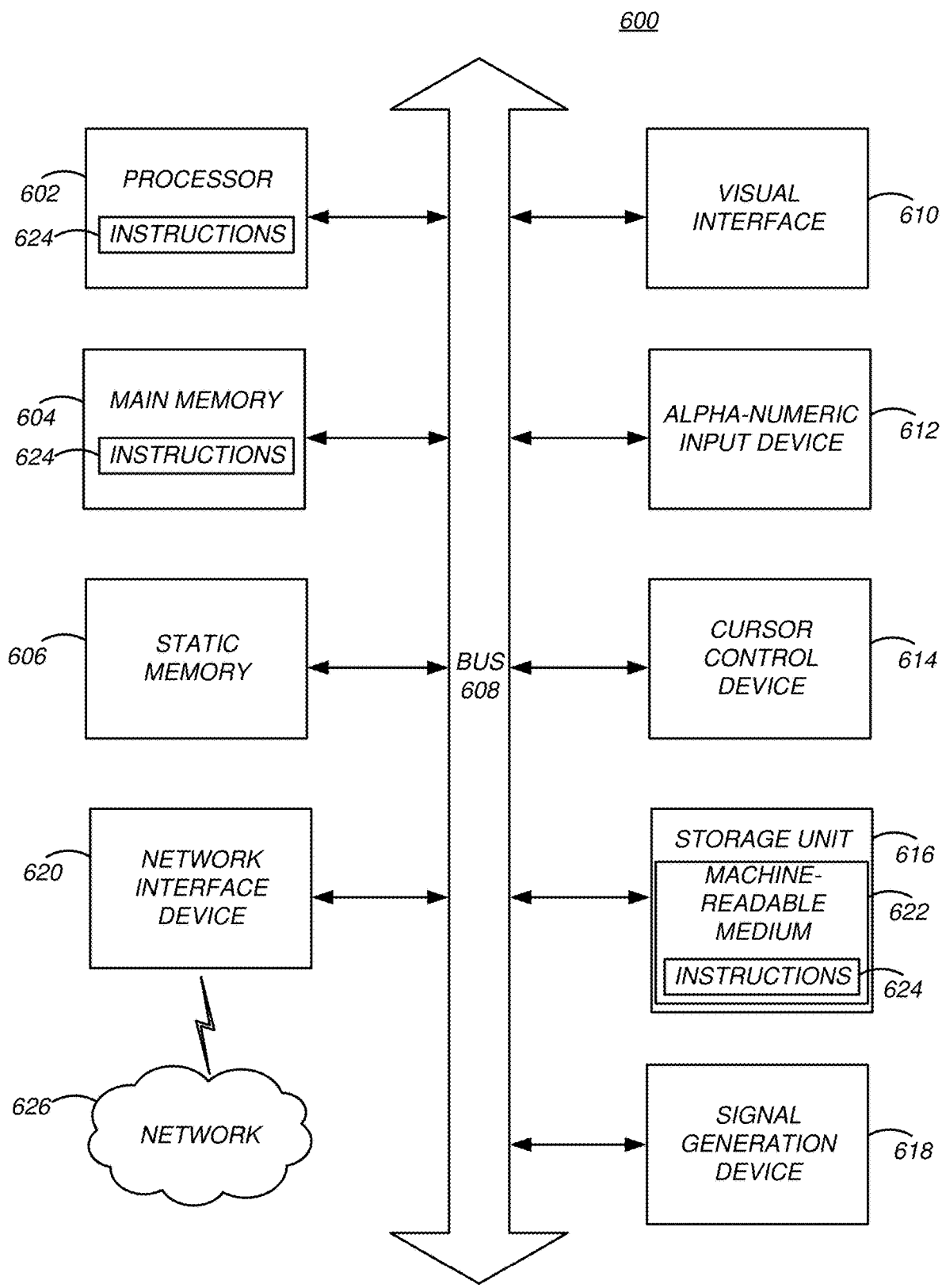
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which program code (e.g., software) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a tablet, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alphanumeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Figure 7:
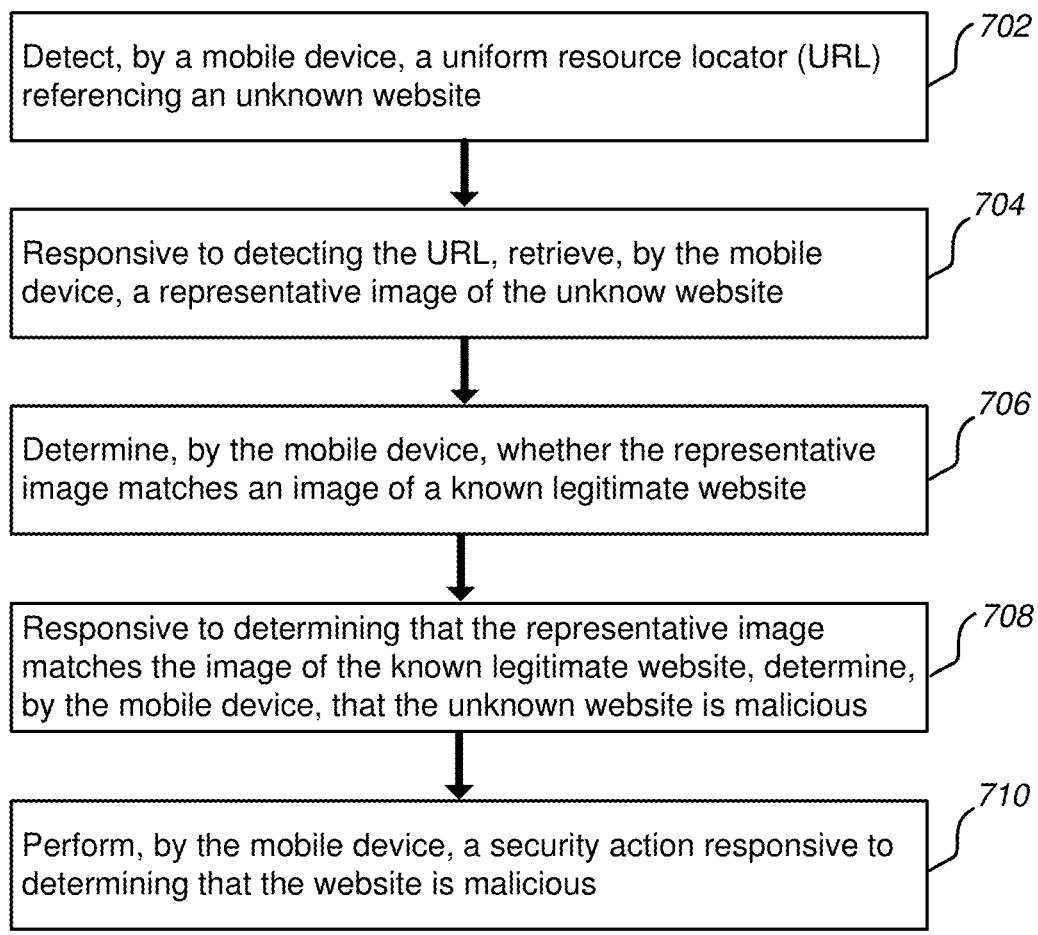
FIG. 7 illustrates one embodiment of a process for detecting a malicious website.

FIG. 7 illustrates one embodiment of a process for detecting a malicious website. Process 700 begins with a mobile device (e.g., mobile device 110) detecting 702 a URL referencing an unknown website. For example, the URL is detected using traffic processing module 251, and the fact that the website is unknown is determined using detection module 252 (e.g., by the unknown website being neither on a blacklist nor a whitelist). Responsive to detecting the URL, the mobile device retrieves 704 a representative image of the unknown website (e.g., using detection module 252 to retrieve a favicon of the unknown website). The mobile device determines 706 whether the representative image matches an image of a known legitimate website (e.g., using detection module 252 to compare the favicon, or a modified version of the favicon, to images of quilt 500). Responsive to determining that the representative image matches the image of the known legitimate website, the mobile device determines 708 that the unknown website is malicious. The mobile device performs 710 a security action responsive to determining that the website is malicious (e.g., using security action module 254).

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for using a representative image of an unknown website to determine whether the unknown website is malicious through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   retrieving, by a mobile device, a representative image of an unknown website detected by the mobile device;
   determining, by the mobile device, whether the representative image matches an image of a known legitimate website by:
      removing a transparency layer from the representative image to form a modified representative image;
      comparing the modified representative image to a set of known images, each of the known images corresponding to one or more respective known websites, each of the known images not having a transparency layer, wherein transparent features are compared in the comparing; and
      determining that the representative image matches at least one of the known images based on the comparing;
   responsive to determining that the representative image matches the image of the known legitimate website, determining, by the mobile device, that the unknown website is malicious; and
   performing, by the mobile device, a security action responsive to determining that the unknown website is malicious.

2. The method of claim 1, wherein comparing the modified representative image to the set of known images comprises comparing the modified representative image to each image of a quilt of known images, the quilt having been produced by:
   resizing each of the known images into a standard representative image size, and
   concatenating the resized known images into the quilt.

3. The method of claim 2, further comprising applying a noise mask to the quilt when the quilt is produced.

4. The method of claim 3, further comprising applying the noise mask to the modified representative image prior to comparing the modified representative image to each of the masked known images.

5. The method of claim 1, wherein determining whether the representative image matches at least one of the known images comprises:
   determining a percentage match between the representative image and a given known image; and
   determining that the representative image matches the given known image based on the percentage match exceeding a threshold.

6. The method of claim 1, wherein determining that the unknown website is malicious comprises:
   performing a plurality of evaluations of the unknown website, each evaluation providing a signal indicating a likelihood that the unknown website is malicious;

combining the signals provided by the plurality of evaluations into a combined signal; and evaluating the combined signal to determine whether the unknown website is malicious.

7. The method of claim 1, wherein the representative image is a favicon.

8. A non-transitory computer-readable storage medium comprising memory with instructions encoded thereon, the instructions causing one or more processors to perform operations when executed, the instructions comprising instructions to:

retrieve, by a mobile device, a representative image of an unknown website detected by the mobile device;

determine, by the mobile device, whether the representative image matches an image of a known legitimate website by:

removing a transparency layer from the representative image to form a modified representative image;

comparing the modified representative image to a set of known images, each of the known images corresponding to one or more respective known websites, each of the known images not having a transparency layer, wherein transparent features are compared in the comparing; and determining that the representative image matches at least one of the known images based on the comparing;

responsive to determining that the representative image matches the image of the known legitimate website, determine, by the mobile device, that the unknown website is malicious; and perform, by the mobile device, a security action responsive to determining that the unknown website is malicious.

9. The non-transitory computer-readable medium of claim 8, wherein the instructions to compare the modified representative image to the set of known images comprise instructions to compare the modified representative image to each image of a quilt of known images, the quilt having been produced by:

resizing each of the known images into a standard representative image size, and concatenating the resized known images into the quilt.

10. The non-transitory computer-readable medium of claim 9, the instructions further comprising instructions to apply a noise mask to the quilt when the quilt is produced.

11. The non-transitory computer-readable medium of claim 9, the instructions further comprising instructions to apply the noise mask to the modified representative image prior to comparing the modified representative image to each of the masked known images.

12. The non-transitory computer-readable medium of claim 10, wherein the instructions to determine whether the representative image matches at least one of the known images comprise instructions to:

determine a percentage match between the representative image and a given known image; and determine that the representative image matches the given known image based on the percentage match exceeding a threshold.

13. The non-transitory computer-readable medium of claim 8, wherein the instructions to determine that the unknown website is malicious comprise instructions to:

perform a plurality of evaluations of the unknown website, each evaluation providing a signal indicating a likelihood that the unknown website is malicious;

combine the signals provided by the plurality of evaluations into a combined signal; and evaluate the combined signal to determine whether the unknown website is malicious.

14. The non-transitory computer-readable medium of claim 8, wherein the representative image is a favicon.

15. A system comprising:

a non-transitory computer-readable storage medium comprising memory with instructions encoded thereon; and one or more processors that, when executing the instructions, perform operations of:

retrieving, by a mobile device, a representative image of an unknown website detected by the mobile device;

determining, by the mobile device, whether the representative image matches an image of a known legitimate website by:

removing a transparency layer from the representative image to form a modified representative image;

comparing the modified representative image to a set of known images, each of the known images corresponding to one or more respective known websites, each of the known images not having a transparency layer, wherein transparent features are compared in the comparing; and determining that the representative image matches at least one of the known images based on the comparing;

responsive to determining that the representative image matches the image of the known legitimate website, determining, by the mobile device, that the unknown website is malicious; and performing, by the mobile device, a security action responsive to determining that the unknown website is malicious.

16. The system of claim 15, wherein comparing the modified representative image to the set of known images comprises comparing the modified representative image to each image of a quilt of known images, the quilt having been produced by:

resizing each of the known images into a standard representative image size, and concatenating the resized known images into the quilt.

17. The system of claim 16, the operations further comprising applying a noise mask to the quilt when the quilt is produced.

* * * * *